United States Patent
Garcia et al.

(10) Patent No.: US 11,038,579 B2
(45) Date of Patent: Jun. 15, 2021

(54) METHODS AND APPARATUSES FOR SPATIAL PRE-PROCESSING OF SIGNALS IN A WIRELESS COMMUNICATION SYSTEM

(71) Applicant: Telefonaktiebolaget LM Ericsson (publ), Stockholm (SE)

(72) Inventors: Virgile Garcia, Beijing (CN); Zhiyuan Jiang, Beijing (CN); Hai Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/341,149

(22) PCT Filed: Oct. 11, 2016

(86) PCT No.: PCT/CN2016/101813
§ 371 (c)(1),
(2) Date: Apr. 11, 2019

(87) PCT Pub. No.: WO2018/068208
PCT Pub. Date: Apr. 19, 2018

(65) Prior Publication Data
US 2020/0127728 A1   Apr. 23, 2020

(51) Int. Cl.
H04B 7/08   (2006.01)
H04W 72/12   (2009.01)

(52) U.S. Cl.
CPC ...... H04B 7/0862 (2013.01); H04W 72/1278 (2013.01)

(58) Field of Classification Search
CPC ............ H04B 7/0862; H04W 72/1278; H04W 72/1263; H04L 25/03305
(Continued)

(56) References Cited

U.S. PATENT DOCUMENTS 6,351,499 B1 * 2/2002 Paulraj ................. H01Q 1/246
375/267
2007/0142086 A1   6/2007 Bousier et al.
(Continued)

FOREIGN PATENT DOCUMENTS

EP   1914947 A1   4/2008
WO   2015131494 A2   9/2015

OTHER PUBLICATIONS

Haghighatshoar, Saeid, et al., "An Active-Sensing Approach to Channel Vector Subspace Estimation in mm-Wave Massive MIMO Systems," IEEE International Conference on Communications, Nov. 2015, 7 pages.
(Continued)

*Primary Examiner* — Kevin M Burd
(74) *Attorney, Agent, or Firm* — Patent Portfolio Builders, PLLC (57) ABSTRACT

Embodiments of the present disclosure provide methods, apparatuses and computer program for spatial pre-processing of signals in a wireless communication system. The method is implemented at a receiving device side and comprises: receiving signals from a transmitting device via a plurality of antennas; and determining, for a resource unit, a spatial pre-processing scheme to be applied to the signals before baseband processing, based on information related to one or more of the received signals, the transmitting device and the receiving device. The method may provide enhancement of signal strength, reduction in complexity of baseband processing, and/or reduction in amount of data to be transmitted over various interface within the receiving device.

20 Claims, 7 Drawing Sheets

(58) Field of Classification Search
USPC .......................................................... 375/347
See application file for complete search history.

(56) References Cited

U.S. PATENT DOCUMENTS

| | | | | |
|---|---|---|---|---|
| 2012/0027139 | A1* | 2/2012 | Khayrallah | ........... H04L 5/0023 |
| | | | | 375/347 |
| 2013/0155891 | A1 | 6/2013 | Dinan | |
| 2013/0301758 | A1* | 11/2013 | Reial | ................ H04L 25/03178 |
| | | | | 375/340 |
| 2017/0302401 | A1* | 10/2017 | Gao | ...................... H04L 1/0003 |

OTHER PUBLICATIONS

Yang, Du, et al., "DFT-based Beamforming Weight-Vector Codebook Design for Spatially Correlated Channels in the Unitary Precoding Aided Multiuser Downlink," IEEE International Conference on Communications, Cape Town, 2010, 5 pages.

International Search Report and Written Opinion for International Patent Application No. PCT/CN2016/101813, dated Jun. 29, 2017, 9 pages.

Extended European Search Report issued in corresponding EP Application No. 16918643.4 dated Feb. 24, 2020, 07 pages.

* cited by examiner

METHODS AND APPARATUSES FOR SPATIAL PRE-PROCESSING OF SIGNALS IN A WIRELESS COMMUNICATION SYSTEM

This application is a 35 U.S.C. § 371 national phase filing of International Application No. PCT/CN2016/101813, filed Oct. 11, 2016, the disclosure of which is incorporated herein by reference in its entirety.

TECHNICAL FIELD

The non-limiting and example embodiments of the present disclosure generally relate to a technical field of wireless communication, and specifically to methods, apparatuses and computer programs for spatial pre-processing of signals at a receiver side in a wireless communication system.

BACKGROUND

This section introduces aspects that may facilitate a better understanding of the disclosure. Accordingly, the statements of this section are to be read in this light and are not to be understood as admissions about what is in the prior art or what is not in the prior art.

In wireless systems, there is a requirement for high throughput, and future wireless networks are being designed with a target data rate of several Gbps. To reach such high bit rates, a solution exploiting a large number of antennas, referred to as massive multiple input multiple output (MIMO) has been considered in some communication systems. Massive MIMO enables to improve quality of the transmitted and/or received signal by using signal processing, as well as enabling multi-user MIMO (MU-MIMO) with a large number users.

In a digitally controlled massive MIMO antenna, each radio element of a radio unit (RU) can be accessed and controlled by a digital unit (DU), so that the DU can control beamforming weights of the radio elements individually. In this way, full flexibility and large processing capability can be achieved. Current wireless communication systems e.g., a Long Term Evolution (LTE) system developed by the Third Generation Partnership Project (3GPP), support, for example, eight controllable antennas. The number of antennas (and potentially number of antenna ports) is expected to be increased to a massive number (potentially in the order of hundreds) in a future wireless communication system, e.g., in next release(s) of LTE.

With such a significant increase in the number of antennas, a paradigm shift in the design and usage of the antennas, the RU and the DU is unavoidable due to, for example, hardware limitations and/or computation complexity.

SUMMARY

The potential gain from massive MIMO can hardly be achieved if there is very low SNR at the receiving antenna elements. Meanwhile, the introduction of massive MIMO results in high processing complexity at the baseband and a requirement for a large amount of data transmission within a receiver, e.g., from the RU to the DU.

In order to solve at least part of the above problems, methods, apparatuses and computer programs are provided in the present disclosure. It can be appreciated that embodiments of the present disclosure are not limited to a wireless system with massive MIMO, but could be more widely applied to any application scenario where similar problems exist.

Various embodiments of the present disclosure mainly aim at providing methods, apparatuses and computer programs for spatial pre-processing of signals at a receiver side in a wireless communication system. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a receiving device in a wireless communication system. The method includes: receiving signals from a transmitting device via a plurality of antennas; and determining, for a resource unit, a spatial pre-processing scheme to be applied to the signals before baseband processing, based on information related to one or more of the received signals, the transmitting device and/or the receiving device. In one embodiment, the information related to one or more of the received signals, the transmitting device and the receiving device may include one or more of: scheduling information of the signals, property of the signals, information of the transmitting device, information related to a processing to be applied to the pre-processed signals, information related to an output requirement for the spatial pre-processing scheme, and information related to an available processing capability of the receiving device.

In an embodiment, the resource unit may include one of: a resource allocated for a transmission of the signals from the transmitting device, a part of the resource allocated for the transmission of the signals, and a resource with pre-defined size.

In another embodiment, the scheduling information of the signals may indicate one or more of: a resource size allocated for transmitting the signals, a type of a channel for carrying the signals, a type of the signals, a modulation and coding scheme for the signals, a number of streams for transmitting the signals. In a further embodiment, determining a spatial pre-processing scheme may include determining the spatial pre-processing scheme based on a predefined mapping between a spatial pre-processing scheme and a type of the signals or a type of a channel for carrying the signals indicated in the scheduling information.

In an embodiment, the property of the signals may indicate one or more of: whether transmission of the signals being scheduled or not, and an amount of the signals.

In another embodiment, the information of the transmitting device may indicate one or more of: a location of the transmitting device, and mobility of the transmitting device.

In still another embodiment, the information related to a processing to be applied to the pre-processed signals may indicate whether the pre-processed signals are to be compressed.

In some embodiments, the information related to an output requirement for the spatial pre-processing may indicate a requirement on one or more of: latency, accuracy and the number of output dimensions.

In an embodiment, the spatial pre-processing scheme may include one or more of: a spatial transformation scheme for transforming the signals into a plurality of signal beams, and a compression scheme for reducing a dimension of the signals.

In another embodiment, determining a spatial pre-processing scheme may include: determining a codebook based spatial transformation scheme in response to one or more of: a resource size allocated for transmitting the signals being below a first threshold, mobility of the transmitting device exceeding a second threshold, an order of a modulation and coding scheme for the signals exceeding a third threshold, the signals being random access signals, the signals being transmitted via a single stream, and no compression scheme to be applied to the signals following the spatial transformation. In still another embodiment, determining a spatial pre-processing scheme may include: determining a non-codebook based spatial transformation scheme in response to one or more of: a resource size allocated for transmitting the signals exceeding a first threshold, mobility of the transmitting device being below a second threshold, an order of a modulation and coding scheme for the signals being below a third threshold, the signals being scheduled, the signals being transmitted via multiple streams, and the spatial transformation being followed by a compression scheme to be applied to the signals.

In an embodiment, determining a spatial pre-processing scheme may include: determining a compression scheme based on one or more: whether a spatial transformation scheme is applied to the signals prior to the compression; a type of the spatial transformation scheme applied to the signals prior to the compression.

In another embodiment, determining a spatial pre-processing scheme may include determining an operating parameter for the spatial pre-processing scheme. In a further embodiment, the operating parameter for the spatial pre-processing scheme may include one or more of: an original pointing direction for the spatial transformation scheme, an oversampling factor for the spatial transformation scheme, a number of dimensions of the signals to be output by the spatial transformation scheme, a number of dimensions of the signals to be output by the compression scheme, and an energy threshold to be used by the compression scheme.

In a second aspect of the disclosure, there is provided a receiving device. The receiving device includes a receiving unit configured to receive signals from a transmitting device via a plurality of antennas; and a determining unit configured to determine, for a resource unit, a spatial pre-processing scheme to be applied to the signals before baseband processing, based on information related to one or more of the received signals, transmitting device and the receiving device.

In a third aspect of the disclosure, there is provided a receiving device. The network device includes a processor and a memory, said memory containing instructions executable by said processor, and said processor being configured to cause the network device to perform a method according the first aspect of the present disclosure.

In a fourth aspect of the disclosure, there is provided a computer program, comprising instructions which, when executed on one or more processors, cause the one or more processors to carry out a method according to the first aspect of the present disclosure.

According to the various aspects and embodiments as mentioned above, received signals may be pre-processed efficiently, baseband processing complexity may be reduced, and/or the amount of data to be transferred internally within the receiving device may be reduced.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth, depending on the applied terminology and technology.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

As one specific example, a terminal device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another specific example, in an Internet of Things (JOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

The term "receiving device" refers to any network device or terminal device which is capable of receiving a signal from another device. Likewise, a "transmitting device" refers to any network device or terminal device that transmits a signal to another device. For example, during an uplink (UL) transmission, a network device (e.g., an eNB) acts as a receiving device and a terminal device acts as a transmitting device, while during a downlink (DL) transmission, the network device acts as a transmitting device and the terminal device acts as a receiving device. As used herein, a DL transmission refers to a transmission from the network device to a terminal device, and an UL transmission refers to a transmission in an opposite direction.

Figure 1:
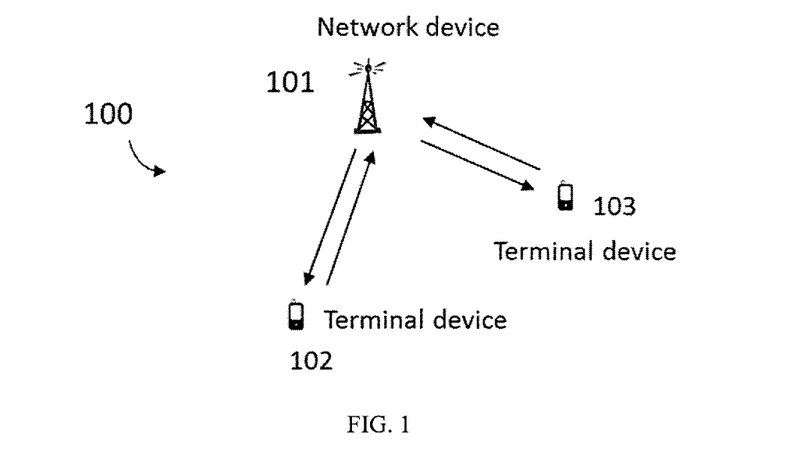
FIG. 1 illustrates an example wireless communication network 100 in which embodiments of the disclosure may be implemented.

FIG. 1 illustrates an example wireless communication network 100 in which embodiments of the disclosure may be implemented. As shown in FIG. 1, the wireless communication network 100 may include one or more network devices, for example network devices 101, which may be in a form of an eNB. It will be appreciated that the network device 101 could also be in a form of a Node B, BTS (Base Transceiver Station), and/or BSS (Base Station Subsystem), access point (AP) and the like. The network device 101 may provide radio connectivity to a set of terminal devices (for example UEs 102 and 103) within its coverage.

To increase throughput, the network device 101 and/or the terminal device 102 or 103 may be equipped with a plurality of antennas, and in some wireless systems, the number of antennas at the network terminal side (and/or the terminal device side) may be increased significantly, e.g., to an order of hundreds.

A large number of antennas can provide large signal processing gains, and at the same time network dimensioning (i.e., cell planning) will be impacted. Cell-edges where a normal SNR would be very low can in principles be pushed "more far away" from the eNB, using very narrow beams. However, the large processing gains may not be achieved in the cell-edge with very low SNR. A very low SNR (e.g. −20 dB) in average at the receiving antenna elements will lead to a very unreliable baseband processing (e.g., quantization loss, poor channel estimation, poor noise estimation, etc.). When the baseband processing becomes so inaccurate, full potential gains can hardly be achieved even by combining a large number of signals.

In addition, with the increased number of antennas, the required processing complexity and the number of baseband operations will increase. A large number of processing operations are required to process a large number (e.g., a hundred or more) input/output signals, and it is practically impossible to complete complex operations (e.g. matrix inversion, channel estimation, and the like) on so large number of inputs in very short time.

A radio unit (RU) is usually a part of the receiving system/device directly connected to the antenna and mainly focuses on the analog signal processing. It may also perform the analog-to-digital conversion (ADC) and maybe a few more processing in the digital domain, before sending the digital data to the digital unit (DU), through an interface (e.g., a CPRI link). The DU usually only treats digital signals, and usually performs heavy processing operations such as channel estimation and decoding. The amount of signals to be transferred from the RU to the DU usually increases with the number of antennas. Therefore, due to introduction of a larger number of antennas (and also due to potentially wider bandwidth in future systems), the interface between the RU and DU (e.g. a CPRI link for eNB) needs to support a data rate much higher than that could be provisioned currently. For example, the required data rate may be one or two orders of magnitude as that a current CPRI link is capable of providing.

Figure 2:
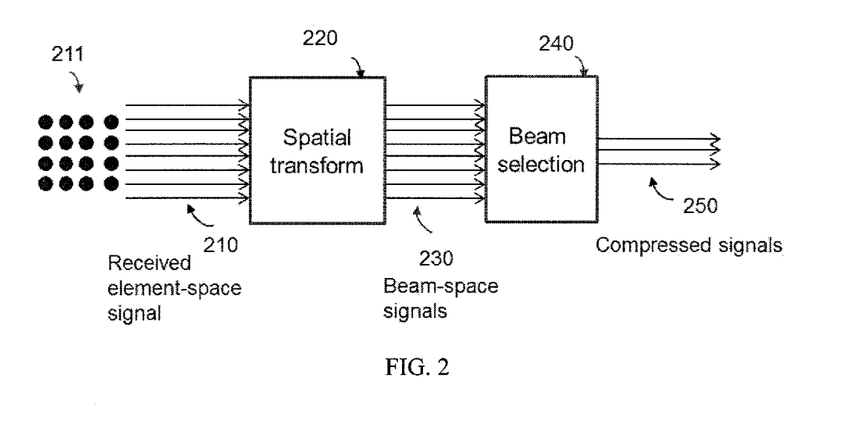
FIG. 2 illustrates an example of signal pre-processing procedure according to an embodiment of the present disclosure.

To reduce these requirements, some pre-processing can be done prior to baseband processing at the receiver side. One example of the pre-processing procedure is shown in FIG. 2. As shown in FIG. 2, signals 210 received at physical antenna elements 211 (also referred to herein as "element-space" signals) may be transformed at block 220, so as to focus on beams of signals (also referred to herein as "beam-space" signals 230). At least some beams of signals 230 have improved signal power compared with the "element-space" signals 210, since energy of signals may be concentrated into a subset of the full dimensions. In addition, the signals 210 or 230 prior to or after beam-space transformation may be compressed at block 240 into signals 250 of lower dimensions (e.g., by selecting a subset or a subspace of the signals), so that both requirements of baseband processing and the amount of raw data to be transmitted over the DU-RU interface will be reduced.

Both the ST block 220 and the subspace compression block 240 are provided in FIG. 2 as examples of pre-processing, and those skilled in the art can appreciate that embodiments of the present disclosure are not limited to the listed specific pre-processing schemes. In addition, though the ST and the compression are implemented in sequence in some cases, at least one of the processing operations can be omitted in another embodiment. That is, neither the ST nor compression is mandatory.

The transformation from element-space signals to beam-space signals can be done via various spatial transformation (ST) schemes (e.g., beamforming or combining). One example is codebook or "index-based" beamforming, where a list of beams is predefined. For example, a list of beams in different directions may be generated using Discrete Fourier Transform (DFT)-based weights. An example for generating DFT-based weight is described in "DFT-Based Beamforming Weight-Vector Codebook Design for Spatially Correlated Channels in the Unitary Precoding Aided Multiuser Downlink" by D. Yang, L. -L. Yang and L. Hanzo, published in 2010 IEEE International Conference on Communications (ICC), 2010, Pages: 1-5, DOI: 10.1109/ICC.2010.5502350, http://eprints.soton.ac.uk/271207/1/03-54-01.PDF. Alternatively, the codebook may be based on oversampled DFT, similar as that specified in LTE, or a Grassmannian-like sub-space packing based codebook. In another embodiment, the codebook may be a precoding codebook defined on-demand.

Alternatively, or in addition, dedicated transformation can be applied where the applied beamforming is computed specifically for given input signals, for example, via Singular Value Decomposition (SVD), Maximum Ratio Combining (MRC), etc. An example for SVD decomposition can be found in "An Active-Sensing Approach to Channel Vector Subspace Estimation in mm-Wave Massive MIMO Systems", by S Haghighatshoar and G Caire in 2015, http://arxiv.org/pdf/1511.01634.

The compression (i.e., dimension reduction) operation is to select and keep only a portion of all available dimensions of the input signals, so as to reduce the number of signals to be processed.

As discussed above, to cope with the low-SNR regime of cell-edges, the ST may be needed to enhance channel estimation quality. Though it is theoretically possible to perform the transformations and/or compression of the signals in the base-band jointly with the channel estimation, it can hardly be implemented in practice due to practical implementation limitations, e.g., it may be impossible to transfer all the raw signals through the DU-RU interface in the scenario of massive MIMO.

Currently, how to perform efficient pre-processing is still an open problem to be solved.

Inventors of the present disclosure have realized that received signal may differ from each another significantly. For instance, the received signals may differ significantly in at least one of: channel/propagation properties, scheduling properties (e.g., single user (SU) or multiple user (MU) scheduling), physical channel structures (e.g., with respect to format, presence of pilot, etc.), processing requirements (e.g., latency, complexity, accuracy, maximum/minimum output dimensions and the like) and presence/type of a further pre-preprocessing and post-processing scheme to be applied. Thus applying a single or fixed transformation/compression scheme to all received signals may not be optimal. For example, in some cases, a given ST or compression scheme may be over dimensioned and result in wasting of processing and dataflow power, while in other cases, the given ST or compression scheme may provide insufficient dimensions and result in degradation of signal quality. In particular, in a MU case, where distinct signals may be received from different users, a compression scheme focusing on only a few best beam dimensions may hide a transmission from a user experiencing bad channel quality and cut it out as noise or undesired interference.

In order to solve at least part of the above problems, methods, apparatuses and computer programs have been proposed herein. It should be appreciated that embodiments of the disclosure are not limited to a wireless system with massive MIMO, but could be more widely applied to any application scenario where similar problem exists. Likewise, embodiments of the present disclosure are not limited to a 3GPP wireless communication network, though it is used as an example scenario.

Figure 3:
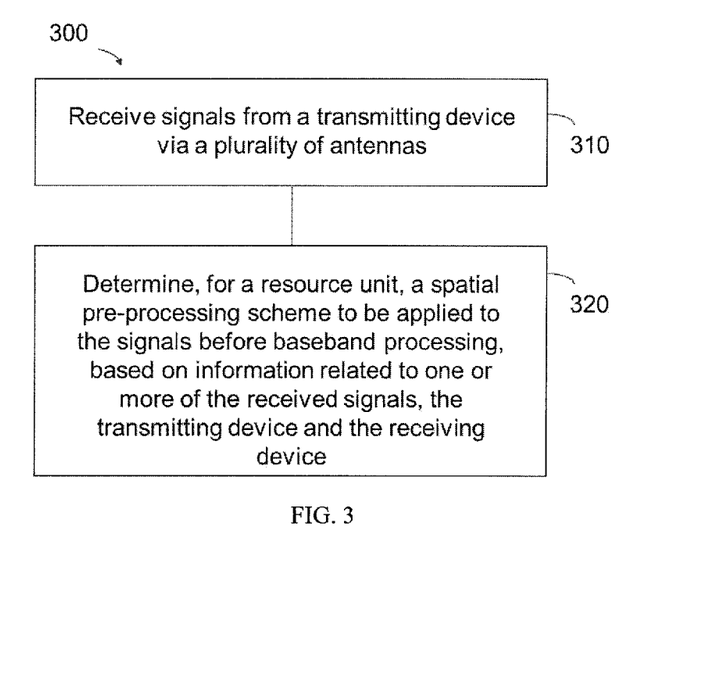
FIG. 3 illustrates a flowchart of a method 300 implemented at a receiving device according to an embodiment of the present disclosure.

Reference is now made to FIG. 3, which shows a flowchart of a method 300 implemented at a receiving device according to an embodiment of the present disclosure. For simplicity, the method 300 will be described below with reference to the network device 101 shown in FIG. 1, however, it can be appreciated that, the method 300 could also be implemented by any other receiving device, for example the UE 102-103 shown in FIG. 1.

At block 310, the network device 101 receives signals from a transmitting device via a plurality of antennas. In one embodiment, the transmitting device may be the terminal device 102 or 103 shown in FIG. 1. For instance, the received signals may be transmitted by the terminal device 102 as a SU transmission. In another embodiment, the received signals may be a part of a MU transmission. In still another embodiment, the received signals may not be scheduled, but be transmitted by the transmitting device in a random accessed way or contention-based way.

At block 320, the network device 101 determines, for a resource unit, a spatial pre-processing scheme to be applied to the signals prior to baseband processing, based on some information related to the received signals. For example, the determination may be based on one or more of: scheduling information of the signals, property of the signals, information of the transmitting device, information related to processing to be applied to the pre-processed signals, information related to output requirement for the spatial pre-processing scheme, and information related to available processing capability of the receiving device.

With the method 300, the receiving device is enabled to determine a spatial pre-processing scheme for the received signals per resource unit. That is, for different resource units, separate spatial pre-processing schemes can be determined. It allows more flexibility in pre-processing scheme selection and thereby providing more potential processing gains at the receiving device side.

Embodiments of the present disclosure are not limited to any specific granularity for the resource unit. In one embodiment, the resource unit for determining a spatial pre-processing scheme may be a resource with predefined size, e.g., a predefined number of physical resource blocks (PRBs). In another embodiment, the size of the resource unit may vary from one transmission to another. For instance, the resource unit may depend on a type of the channel for carrying the signals. As another example, the resource unit may be defined as a resource allocated for a transmission of the signals from the transmitting device. In this example, the network device is enabled to determine a spatial pre-processing scheme for each received transmission separately.

In a further embodiment, especially when a transmission (or in other words, the received signals) occupies a large resource size, the network device may divide the occupied resource into several resource units (in frequency and/or time domain) and determine a spatial pre-processing scheme for each resource unit respectively. In this example, the resource unit is only a part of the resource allocated for the transmission of the signals. In one embodiment, the network device 101 may apply different pre-processing scheme on different frequency resources, even these resource corresponding to a same time (e.g., a same time slot or subframe).

Figure 4A:
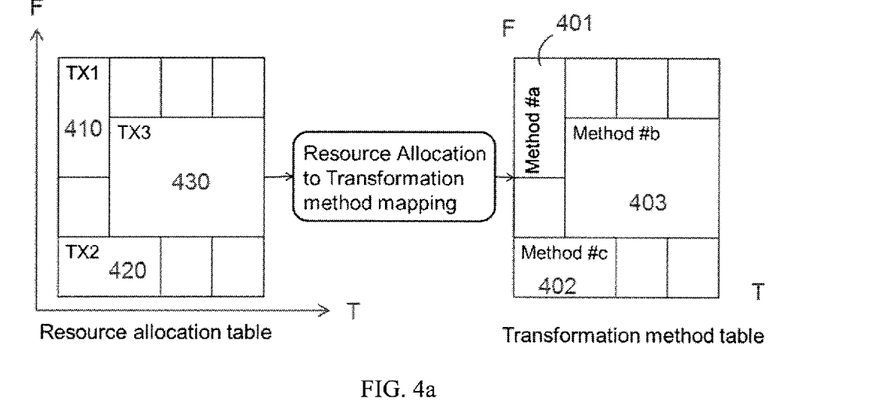
FIG. 4a illustrates an example of determining the pre-processing scheme per resource unit according to an embodiment of the present disclosure.

In FIG. 4a, an example of determining the pre-processing scheme per resource unit is provided. In the example shown in FIG. 4a, the network device 101 receives (e.g., at block 310 shown in FIG. 3) three transmissions (TX1 410, Tx2 420, Tx3 430 shown in FIG. 4a) in a resource table consisting of four resource elements in frequency domain and four resource elements in time domain. Then the network device determines a pre-processing method (method #a 401, #b 403, or #c 402 shown in FIG. 4a) for each resource unit at block 320 of FIG. 3, and in this example a resource unit corresponds to a resource allocated for a transmission. It should be appreciated, that though this figure shows a simplified one to one mapping between a transmission resource and pre-processing method, other variants can be considered in another example embodiment. For example, a same pre-processing method may be applied to more than one received transmissions, or, more than one pre-processing methods may be applied to different resources of a single received transmission.

Referring back to FIG. 3, at block 320, the network device 101 may take one or more factors into account during the determination of the pre-processing scheme. For instance, the network device may determine the pre-processing scheme based on scheduling information of the signals which indicates one or more of: a resource size allocated for transmitting the signals (e.g., 1 PRB or 4 PRBs); a type of a channel for carrying the signals such as a physical uplink shared channel (PUSCH) or a random access channel (RACH), or a physical uplink control channel (PUCCH); a type of the signals such as a scheduled signal or non-scheduled signals (e.g., a random access signal, or a contention based signal), or, a data signal, control signal or reference signal; a modulation and coding scheme for the signals such as BPSK or QPSK, or 16QAM; and a number of streams for transmitting the signals such as a single stream or multiple streams.

In an embodiment, the network device may choose a pre-processing scheme from a predefined list of pre-processing schemes based on the scheduling information or user information of the received signals. Different pre-processing schemes (e.g., spatial transformations schemes) may have different complexity, numbers of codewords and/or spatial properties. For instance, two DFT-based codebooks for ST may sample the space in different directions. Even for a given "type" of ST, several schemes may be available for the selection. Then by using scheduling information or user information of the received signals, the network device 101 may be able to select a codebook with wide beams or narrow beams on demand. The pre-processing schemes may even be simply turned off as well based on the scheduling information or user information of the received signals.

As an example, the network device may determine the pre-processing scheme based on physical resources allocated for a received transmission. A resource index and size of a transmission and/or a number of symbols to be processed may vary, and a transmission spanning over many resource elements (e.g., in time domain and/or in frequency domain) is more suitable to be pre-processed using a complex spatial transformation method, e.g. a SVD-based ST method. Then, in an embodiment, at block 320, the network device 101 may determine the pre-processing scheme according to the size of the resource. As another example, for a received first transmission with resources allocated next to or close to a second received transmission, the network device 101 may treat resource for the two received transmissions as a single block of resources, and determine a single pre-processing scheme for them.

A wideband transmission usually carries many symbols that span over a large frequency fading variations and are to be processed jointly. In an embodiment, a lighter and more robust pre-processing method based on a fixed codebook (e.g., a DFT-based ST scheme) may be determined at block 320 for the received wideband signals.

Alternatively, or in addition, at block 320, the network device may determine the pre-processing scheme based on a type of the received signal or a type of a channel for carrying the received signals. For example, the network device 101 may determine the spatial pre-processing scheme based on a predefined mapping between a spatial pre-processing scheme and a type of the signals or a type of a channel for carrying the signals indicated by the scheduling information. That is to say, the network device 101 may be able to map scheduling information or user information into a preferred pre-processing method. For instance, in LTE terminology, the mapping may consist in a set of rules such that a first pre-processing method is applied to all resources used for a PUSCH, and/or a second pre-processing method is applied to all resources used for PRACH.

Alternatively, or in addition, at block 320, the network device 101 may determine the pre-processing scheme based on property of the received signals that may indicate, for example whether transmission of the signals being scheduling based or not, and/or an amount of the signals.

In another embodiment, the network device 101 may determine the pre-processing scheme based on information of the transmitting device which may include one or more of: a location of the transmitting device, and mobility of the transmitting device. For instance, if the transmitting device is moving fast, a spatially robust pre-processing scheme (e.g., a subsampled DFT-based ST scheme with wide beams) may be preferred to be applied to the received signals, while for a transmitting device with low mobility, the network device 101 may determine to use a specific ST (e.g. SVD-based) scheme for the received signals. Optionally, one or more speed thresholds may be applied to determine a preferred pre-processing method. Note that the location of the transmitting device may include relative location information, such as distance, directions (angles of arrivals) relative to a given entity.

As another example, the network device 101 may determine the pre-processing scheme based on information related to processing to be applied to the pre-processed signals, e.g., based on whether a further compression scheme is to be applied to the pre-processed signals, and/or a type of the further compression scheme. For example, if a ST scheme is followed by a subspace selection scheme for reducing signal dimensions (i.e., a compression scheme), the number of signal dimensions will be low after the subspace selection, and in such a case, an efficient ST method such as a SVD-based method would be required to capture the incoming signals correctly at a price of higher complexity. Again, threshold(s) can be applied to define which ST method to use, based on the ratio between output/input dimensions of the subspace selection scheme.

In some embodiments, at block 320, the network device may determine the pre-processing scheme based on information related to an output requirement for the spatial pre-processing, e.g., based on an output requirement on latency and/or accuracy and/or the number of dimensions. For instance, urgent signals need fast processing, and then at block 320, the network device 101 may determine to use a low complexity pre-processing scheme for the received urgent signals.

As another example, the pre-processing scheme may be determined by the network device 101 based on information related to its available processing capability. For example, if it is anticipated by the network device 101 that a desired compression method will not be able to be performed by the hardware due to other planned process (e.g. other compression operations planned at the same time), a pre-processing with lower complexity will be determined to be used at block 320.

In some embodiments, the spatial pre-processing scheme determined at block 320 may include one or more of a spatial transformation (ST) scheme for transforming the signals into a plurality of signal beams, and a compression scheme for reducing a dimension of the signals. In an example where the pre-processing scheme includes both the ST and the compression schemes, the preprocessing procedure may be similar as that shown in FIG. 2. However, it should be appreciated that in some other embodiments, the pre-processing scheme determined at block 320 may include an additional or other processing scheme.

In one embodiment, at block 320 of FIG. 3, the network device may determine to use a codebook based ST scheme in response to detecting one or more of the following:
  A resource size allocated for transmitting the signals is below a first threshold,
  Mobility of the transmitting device exceeds a second threshold,
  An order of a modulation and coding scheme for the signals exceeds a third threshold,
  The signals are random access signals,
  The signals are transmitted via a single stream, and
  No compression scheme is to be applied to the signals following the spatial transformation.

In another embodiment, the network device 101 may determine to use a non-codebook based ST scheme (e.g., a SVD based ST scheme) in response to one or more of the following:
  A resource size allocated for transmitting the signals exceeds a first threshold,
  Mobility of the transmitting device is below a second threshold,
  An order of a modulation and coding scheme for the signals is below a third threshold,
  The signals are scheduled signals,
  The signals are transmitted via multiple streams, and
  The spatial transformation is followed by a compression scheme to be applied to the signals.

Alternatively, or in addition, at block 320 of FIG. 3, the network device 101 may determine, per resource unit, a compression scheme to apply to the received signals based on one or more of: whether a ST scheme is applied to the received signals prior to the compression, a type of the ST scheme, and/or scheduling or user information. Then in some embodiments, the network device 101 is able to dynamically select, for any resource, a suitable subspace selection method and suitable number of output dimensions (i.e. number of data streams) to be further processed. In particular, in an embodiment, at block 320, the network device 101 may determine different sub-space selection methods for different resources (even different frequency resources at the same time).

In an embodiment, at block 320, the network device 101 may determine an operating parameter for the spatial pre-processing scheme. As an example, the operating parameter may include, but not limited to, one or more of the following: an original pointing direction for a ST scheme, an oversampling factor for the ST scheme, a number of dimensions of the signals to be output by the ST scheme, a number of dimensions of the signals to be output by a compression scheme, and one or more energy thresholds to be used by the compression scheme. In another embodiment, at block 320, the network device 101 may determine different dimension size to be output by a compression scheme for different resources.

In some embodiments, various subspace selection approaches for compression (or compression scheme) can be predefined, and at block 320, the network device 101 may use different processes, criterion or factors/parameters to determine which compression method to use and/or which dimensions of the received signals to keep or remove, and/or, which operating parameter to be used by a compression method. The criterion and/or factor/parameter used by the network device 101 for the determination may be changed to match a desired application.

Figure 4B:
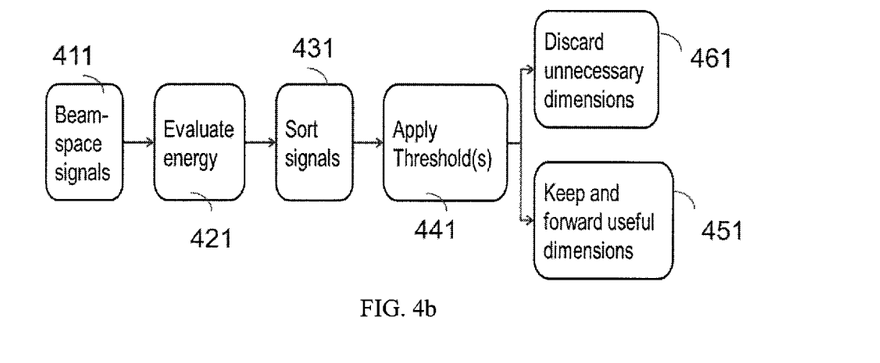
FIG. 4b shows an example of a compression scheme for pre-processing based on a threshold according to an embodiment of the present disclosure.

An example of the criterion for determination may be based on a threshold of beam energy. FIG. 4b shows one example of compression based on threshold. As shown, after the received signals are spatial transformed into a beam space at block 411, an operation may be performed to evaluate energy of signals at block 421, and then sort the signal dimensions based on their energy at block 431. A dimension with the strongest received energy contains the most information while a dimension with the weakest is likely noise. Then at block 441, a threshold (or a combination of several thresholds) may be used by the network device 101 to separate useful dimensions (451) from noisy dimensions (461, which will be discarded).

In one example, a threshold T1 may be set based on the maximum received energy beam dimension (say $E_{max}$) and an offset $T_e$. For example, any beam dimension below a threshold $T1=E_{max}-T_e$ can be seen as not useful. As another example, a threshold T2 may be set based on the noise level $E_{noise}$ and an offset $T_{noise}$. For example, any beam energy higher than a threshold $T2=E_{noise}+T_{noise}$ can be seen as useful.

The choice of threshold (or combination of thresholds) and value(s) of threshold(s) to apply in a compression scheme may depend on the received signals. That is, the network device 101 may choose different threshold for different signals. For instance, random access signals or unsynchronized signals may be expected to have weak received signal power, and the network device may receive multiple signals at the same time. For one of such signals, it is useful to keep as much dimension as possible, and therefore threshold for compression of such signals should be set in a conservative manner, for example, the threshold may be set to be close to $E_{noise}$, i.e., $T2=E_{noise}+T_{noise}$ and a very small value for $T_{noise}$ is used.

As another example, in a single user (SU) reception scenario, a threshold $T1=E_{max}-T_e$ may be applied, so as to remove any undesired signal dimensions while keep the desired one(s) (i.e., signal dimension(s) with strongest power).

In the MU transmission case, or in a scenario where signals are transmitted with a rank higher than one, some useful signals may have energy much lower than others. In view of such energy difference, an additional offset $T_{rank}$ can be considered to generate the threshold. For example, the threshold may be set to be $T3=E_{max}-T_e-T_{rank}$, where $T_{rank}$ represents the expected energy difference among useful dimensions.

Alternatively, or in addition, the choice of a threshold, a combination of thresholds and/or value(s) of threshold(s) may also depend on presence or type of a ST scheme prior to the compression (e.g., subspace selection).

Typically, a SVD-based ST scheme may be very efficient to concentrate the energy to a few dimensions, while a codebook based ST scheme may cause energy spread over dimensions. Thus, if a SVD-based ST scheme is applied prior to a compression scheme, a more aggressive threshold (i.e., a large threshold) for the compression scheme may be used so as to focus on the dimensions with maximum energy levels.

Figure 5A:
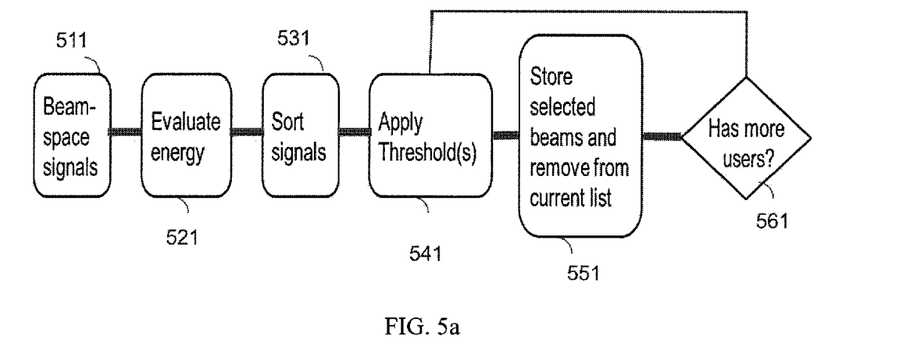
FIG. 5a illustrates a schematic flow chart of a method for compression via beam selection according to an embodiment of the present disclosure.

As another example, a possible sub-selection method may depend on the received signals. For instance, in a MU transmission case, a compression scheme with a similar threshold framework as presented previously as T1 may be applied, and the network device 101 may determine to use different energy thresholds for compressing signals from different users (or transmitting devices). In an example shown in FIG. 5a, the network device 101 may select the strongest beams for different users recursively. As illustrated in FIG. 5a, the network device 101 may determine to use the threshold $T1=E_{max}-T_e$ at block 541 to select the best beam (e.g., selecting the beams higher than T1) and then remove the selected beam from a list at block 551. The network device determines a threshold with a new value and restarts the selecting process by setting the $T_e$ to the new base value, so as to focus on another transmission/user at block 561. Other operations 511 to 531 may be similar as that in blocks 411 to 431 described with reference to FIG. 4b respectively.

Figure 5B:
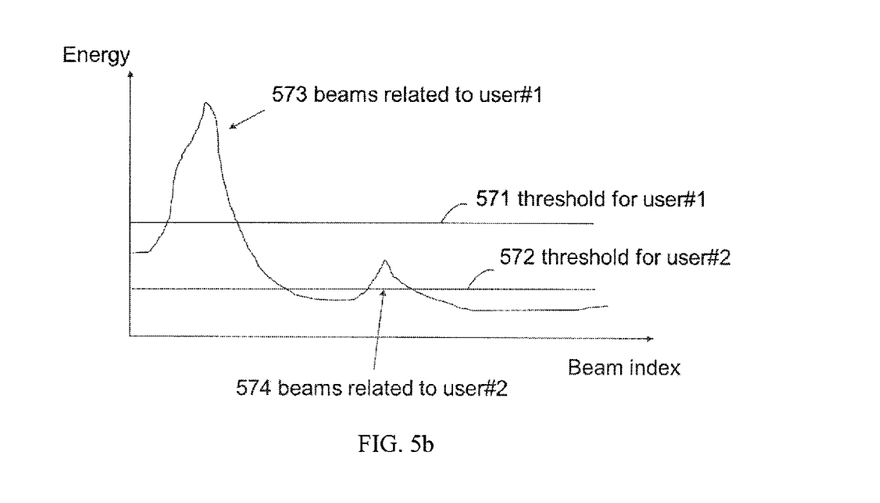
FIG. 5b illustrates schematically a compression scheme with different thresholds for two different users according to an embodiment of the present disclosure.

In FIG. 5b, different thresholds for two different users are illustrated as an example. By using a threshold 571 for user #1, a beam 573 for user #1 may be selected, while using a threshold 572 for user #2, a beam 572 for user #2 may be selected.

In the case where the ST has a strong directivity component in the beam generation, the beam selection method for compression following the ST operation can use a cluster-based algorithm. For example, using a DFT-based ST, each beam corresponds to a given direction in space. Thus, looking at a distribution of the energy received on each beams, some "peaks" of power adjacent to each other will be observed, and these "peaks" correspond to a direction of arrival (DOA) of the signals. Then beams can be separated into clusters, and then sorted to keep the best beams within a cluster. The clusters may represent either multi-path components of signals or signals coming from different users. The network device 101 may apply a separate threshold or a separate value of the threshold to each cluster.

In some embodiments, the dimension(s) of data signals output from a compression scheme may be defined on a per transmission basis (or on a per resource basis). For instance, in a scenario where different sub-selection methods are applied to different signals, and/or the received signal are different (in particular in their spatial properties), the number of dimensions to be output from a compression scheme can be chosen individually for different resource blocks, and/or different signal reception, etc. In an embodiment, by sorting/selecting the useful subspace using a dynamic algorithm, the output may have different dimensions for different resources and/or transmissions.

The number of dimensions selected by the compression scheme may be reported to another module for further processing of the compressed signals, for example, information related to the number of dimensions may be sent together with the data to be processed. In another embodiment, an overhead message including the information related to the number of dimensions may be send separately to the other module. The message may contain the information on the number of dimensions for a given physical resource or transmission.

In another embodiment, an aggregated message can be constructed to include information related to dimensions of all ongoing transmissions. For instance, a resource-dimension mapping table may be used to indicate the dimension for each physical resource of interest.

Corresponding dimension identifiers may also be reported, for example, as an index (if the input of the compression scheme is an output from a codebook-based ST scheme), or as a precoding vector/matrix (if the input of the compression scheme is an output from non-codebook based dynamic ST method).

In another embodiment, the network device 101 may determine the number of dimensions to be output from the compression scheme at least partly based on an external facto, limitation or requirement. For example, a limitation on the maximum number of dimensions to be output may be imposed to some (or all) resources, temporarily or permanently. If the compression algorithm outputs more dimensions than the maximum limit, the weakest dimensions with lowest energy will be discarded and only a number of dimensions no more than the limitation are kept. For an optimal control, the limitation may be known to the compression module beforehand (e.g., via predefinition or via message from another module) to enable a dynamic adjustment of its dimension selection.

Alternatively, or in addition, a limitation on the minimum number of dimensions to be output from a compression scheme may be imposed to some (or all) resources, temporarily or permanently. Likewise, the limitation may be known to the compression module beforehand.

As an example, the limitation on the minimum dimension number may be imposed in a scenario with multi-user transmissions and/or transmission rank higher than one (1) in order to make sure that at least one dimension per layer is kept typically.

In another example embodiment, the limitation on the maximum and minimum number of dimensions may be imposed due to system or hardware limitations. For example, the limitation may be maximum total number of dimensions that is acceptable to several (logical) entities inside the receiving device (e.g., the network device 101), such as a scheduler, a signal processing unit (e.g. the channel estimator), and a controller of hardware/interface, etc.

In an embodiment, the network device 101 may determine the pre-processing scheme (e.g., a compression scheme and/or operating parameters thereof) by taking into account load balancing between concurrent transmission resources. For example, if the network device 101 has a limited data processing capability or interface data rate, it may choose to prioritize which transmission, or in other words, to give more or less dimensions to which transmission of a plurality of concurrent transmissions.

As an example, a receiving device (e.g., the network device 101) may be capable of treating eight dimensions in total and may need to process a rank-4 transmission and a rank-1 transmission at the same time; the first rank-4 transmission would require to be processed with at least 4 dimensions, and possibly more for good quality, while the later rank-1 transmission may require at least one dimension for processing. In such a case, a possible limitation could be to keep a maximum number of 6 dimensions for the two transmissions.

Figure 5C:
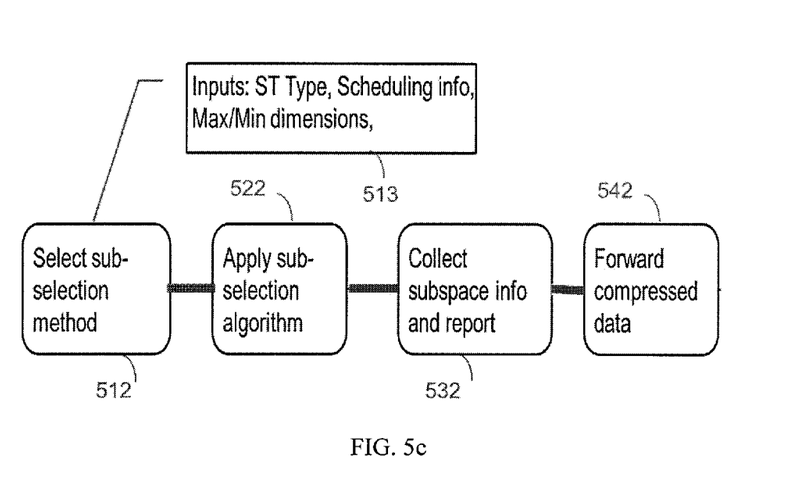
FIG. 5c illustrates an example processing procedure performed at the receiving device according to an embodiment of the present disclosure.

Various embodiments of the method 300 enable the receiving device to select a suitable pre-processing scheme flexibly and dynamically. It will be appreciated that after determining the pre-processing scheme, the receiving device may apply the selected pre-processing to the received signals, and perform any other required processing, for example in a similar way as that performed in a conventional receiving system. An example processing procedure performed at the receiving device is illustrated in FIG. 5c.

In this example, at block 512, the network device 101 select a compression scheme (e.g., a subspace selection method) according to an embodiment of method 300, for example based on an input 513 including ST type, scheduling information and/or maximum/minimum output dimensions, and then the selected compression scheme is applied at block 522 to the signals. The network device 101 may collect information related to the output subspace and reported to a further module at block 532. At block 542, the network device 101 may forward the compressed data to the further module for further pressing of the data.

Figure 6:
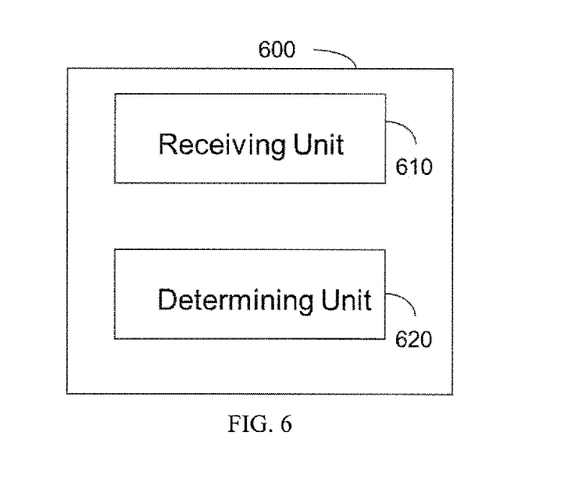
FIG. 6 illustrates a schematic block diagram of an apparatus in a wireless communication network according to an embodiment of the present disclosure.

FIG. 6 illustrates a schematic block diagram of an apparatus 600 in a wireless communication network (e.g., the wireless communication network 100 shown in FIG. 1). The apparatus may be implemented as/in a network device or a terminal device (e.g., the network device 101 or terminal device 102, 103 shown in FIG. 1). The apparatus 600 is operable to carry out the example method 300 described with reference to FIG. 3 and possibly any other processes or methods. It is also to be understood that the method 300 is not necessarily carried out by the apparatus 600. At least some operations of the method 300 may be performed by one or more other entities.

The apparatus 600 includes a receiving unit 610 and a determining unit 620. The receiving unit 610 is configured to receive signals from a transmitting device via a plurality of antennas; and the determining unit 620 is configured to determine, for a resource unit, a spatial pre-processing scheme to be applied to the signals before baseband processing, based on one or more of: scheduling information of the signals, property of the signals, information of the transmitting device, information related to a processing to be applied to the pre-processed signals, information related to an output requirement for the spatial pre-processing scheme, and information related to an available processing capability of the receiving device.

In one embodiment, the receiving device may be a device capable of massive MIMO, and the receiving unit 610 may be configured to receive signals via massive number of antennas. However, embodiments of the present disclosure are not limited to the specific scenario.

In another embodiment, the determining unit 620 may be configured to determine the spatial pre-processing scheme per resource unit in a similar way as that described with reference to block 320 of method 300, and therefore, related descriptions with respect to the determining operation provided with reference to FIGS. 3-5c and method 300 also apply here and details will not be repeated.

As described with reference to block 320 of method 300, the determined pre-processing scheme may include a ST scheme and/or a compression scheme. In another embodiment, the determining unit may be configured to determine a spatial pre-processing scheme by determining an operating parameter for the spatial pre-processing scheme.

It should be appreciated that the receiving device or the apparatus 600 may include other units besides the receiving unit 610 and the determining unit 620. For example the receiving device may include a pre-processing unit not shown in FIG. 6, for performing the pre-processing based on a result of the determination.

Figure 7A:
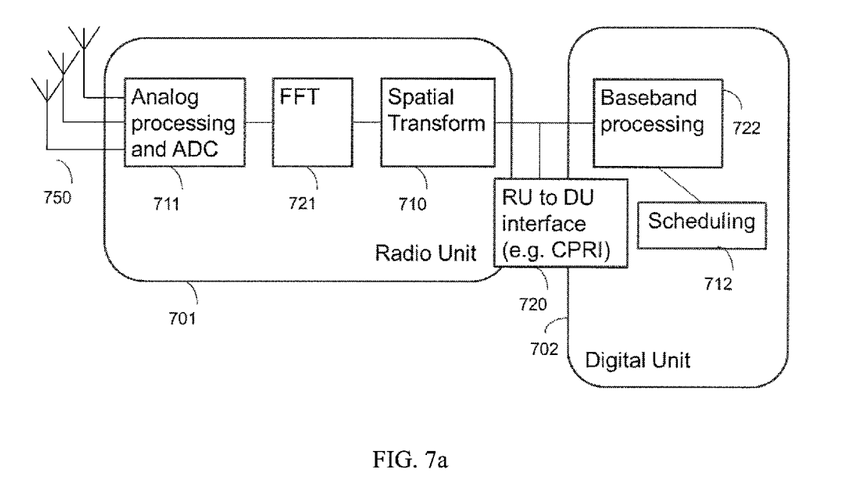
FIGS. 7a-7c illustrate schematic block diagrams of a part of a receiving device according to an embodiment of the present disclosure.

FIGS. 7*a*-7*d* illustrate block diagrams of example implementations of part of a receiving device (e.g., the network device 101). FIG. 7*a* shows a general diagram of part of the receiving device with a RU 701 and a DU 702. The RU 701 may include a block 711 for receiving signal from antennas 750, analog processing of the signals and analog to digital conversion (ADC), a block 721 for FFT, and a block 710 for spatial transform (ST) operation. The exact pre-processing operation to be performed in the ST block 710 may be determined by the receiving unit 620 of FIG. 6. After spatial transform, signals will be transferred over the RU-DU interface 720 (e.g., a CPRI interface) to the DU 702. The DU 702 may include a block 712 for scheduling, and a block 722 for baseband processing.

Figure 7B:
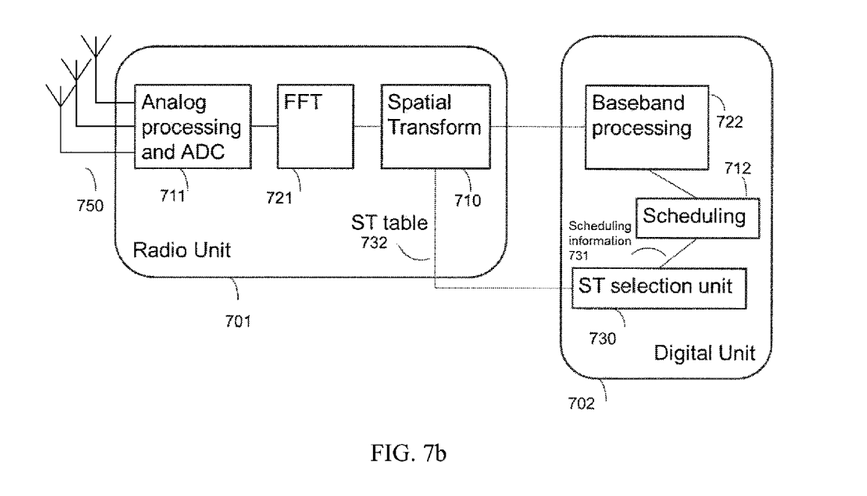
Figure 7C:
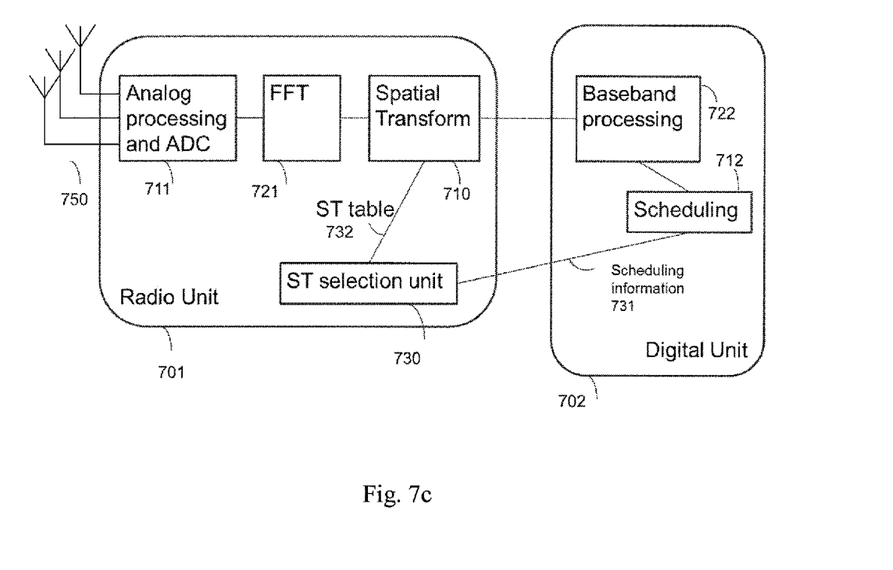

In FIG. 7*b*, a ST selection unit 730 is shown as an example of the determining unit 620 of FIG. 6. In the example of FIG. 7*b*, the ST selection unit 730 is implemented in the DU 702. The ST selection unit 730 may determine the ST scheme to be performed by the ST block 710 based on an input 731 (e.g., including scheduling grant or other scheduling information) from the scheduling block 712. In one embodiment, the ST selection unit 730 may output a ST table 732 to the ST block 710. In FIG. 7*c*, another example is provided where the ST selection unit 730 is implemented in the RU 701.

Figure 7D:
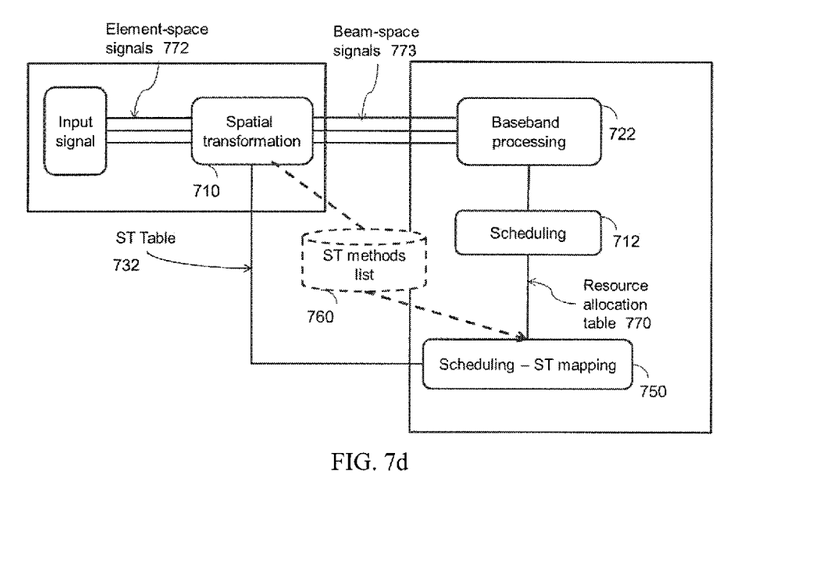
FIG. 7d shows a logical process for a mapping between the resource allocation table and a ST table according to an embodiment of the present disclosure.

In FIG. 7*d*, a logical process for a mapping between the resource allocation table 770 and a ST table 732 is illustrated. The knowledge (or expectation) of the resource allocation from the scheduling block 712 is given as input to a scheduling to ST scheme mapping unit 750 which may be part of the determining unit 620 shown in FIG. 6. The mapping unit 750 decides which compression and/or ST method to use for each resource. Then, the mapping unit 750 informs the ST unit 710 of the ST methods to be used for each resource, e.g., via a ST table 732. Optionally, the mapping unit 750 and the ST unit 710 may share a common understanding of the compression methods available, e.g. via a list 760 of available compression methods and settings for these methods. The element-space signal 772, the ST block 710 and the beam-space signal 773 may be same as 210-230 described with reference to FIG. 2 respectively.

In an example embodiment, a message containing the compression table, i.e. including the method information and settings, and corresponding resources to which the method are applied, may be transmitted between the mapping unit 750 and the compression unit or ST unit 710. This message can contain explicit information about the methods and settings or indices of a predefined list of these methods and settings.

The units/blocks shown in FIGS. 7*a*-7*d* are logical blocks and then a plurality of functions performed can be done in the single physical entity. For example, the mapping shown in FIG. 7*d* can be jointly done in the ST unit 710 within the RU 701, and the selection entity (e.g., the ST or compression selection unit) may send the resource allocation directly to that mapping and ST joint unit 710. Alternatively, the mapping/selection operation may be done jointly in the scheduling block 712, and/or results of the processing in the Digital Unit 702 and the compression table may be sent to the Radio Unit 701.

In an embodiment, the choice of the ST method can be on a per-allocation basis, persistent or semi-persistent. In another embodiment, some signals are known to be regularly transmitted and occupy a predefined resource allocation (e.g. PRACH in LTE, or periodic reference signals occupy predefined resource). Therefore, the compression method for these signals may be a default compression method for such signals, so as to avoid unnecessary and frequent mapping operation and table information communication. In an embodiment, the validity of the ST table may be included in a message containing the ST table, for example, the validity information may indicate "as long as no further notice". A message indicating a new ST method for a given resource should override the existing one, if any.

Figure 8:
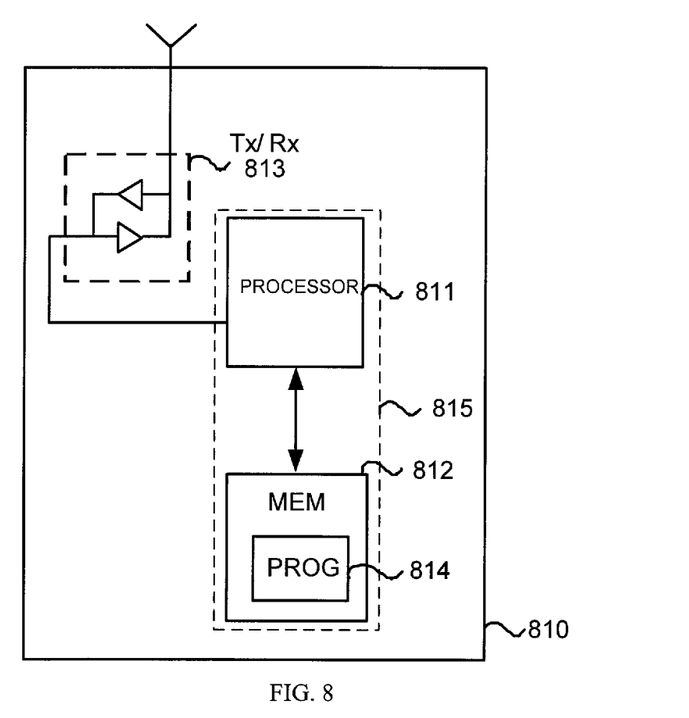
FIG. 8 illustrates a simplified block diagram of an apparatus that may be embodied as/in a receiving device.

FIG. 8 illustrates a simplified block diagram of an apparatus 810 that may be embodied in/as a network device or a terminal device, e.g., the network device 101, or one of the terminal devices 102-103 shown in FIG. 1.

The apparatus 810 may include one or more processors 811, such as a data processor (DP) and one or more memories (MEM) 812 coupled to the processor 811. The apparatus 810 may further include a transmitter TX and receiver RX 813 coupled to the processor 811. The MEM 812 may be non-transitory machine readable storage medium and it may store a program (PROG) 814. The PROG 814 may include instructions that, when executed on the associated processor 811, enable the apparatus 810 to operate in accordance with the embodiments of the present disclosure, for example to perform the method 300. A combination of the one or more processors 811 and the one or more MEMs 812 may form processing means 815 adapted to implement various embodiments of the present disclosure.

Various embodiments of the present disclosure may be implemented by computer program executable by one or more of the processors 811, software, firmware, hardware or in a combination thereof.

The MEM 812 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processor 811 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless system operating in a shared frequency band (e.g., an unlicensed band), it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a receiving device in a wireless communication network, the method comprising:
   receiving signals from a transmitting device via a plurality of antennas; and
   determining, for a resource unit, a spatial pre-processing scheme to be applied to the signals before baseband processing, based on a predefined mapping between the spatial pre-processing scheme and a type of a channel for carrying the signals, wherein the type of the channel for carrying the signals is indicated in information related to one or more of the received signals, the transmitting device, and the receiving device, and wherein the spatial pre-processing scheme comprises at least a spatial transformation scheme.

2. The method according to claim 1, wherein the resource unit includes one or more of:
   a resource allocated for a transmission of the signals from the transmitting device,
   a part of the resource allocated for the transmission of the signals, and
   a resource with predefined size.

3. The method according to claim 1, wherein the information related to one or more of the received signals, the transmitting device, and the receiving device includes one or more of:
   scheduling information of the signals,
   property of the signals,
   information of the transmitting device,
   information related to a processing to be applied to pre-processed signals,
   information related to an output requirement for the spatial pre-processing scheme, and
   information related to an available processing capability of the receiving device.

4. The method according to claim 3, wherein the scheduling information of the signals indicates one or more of:
   a resource size allocated for transmitting the signals,
   the type of the channel for carrying the signals,
   a type of the signals,
   a modulation and coding scheme for the signals, and
   a number of streams for transmitting the signals.

5. The method according to claim 3, wherein the property of the signals indicates one or more of:
   whether transmission of the signals is being scheduled or not, and
   an amount of the signals.

6. The method according to claim 3, wherein the information of the transmitting device indicates one or more of:
   a location of the transmitting device, and
   mobility of the transmitting device.

7. The method according to claim 3, wherein the information related to the processing to be applied to the pre-processed signals indicates whether the pre-processed signals are to be compressed.

8. The method according to claim 3, wherein the information related to the output requirement for the spatial pre-processing scheme indicates a requirement on one or more of latency, accuracy, and a number of output dimensions.

9. The method according to claim 1, wherein the spatial transformation scheme is used for transforming the signals into a plurality of signal beams, and wherein the spatial pre-processing scheme further comprises:
   a compression scheme for reducing a dimension of the signals.

10. The method according to claim 9, wherein determining the spatial pre-processing scheme comprises:
  determining a codebook based spatial transformation scheme in response to one or more of:
    a resource size allocated for transmitting the signals being below a first threshold,
    mobility of the transmitting device exceeding a second threshold,
    an order of a modulation and coding scheme for the signals exceeding a third threshold,
    the signals being random access signals, and
    the signals being transmitted via a single stream.

11. The method according to claim 9, wherein determining the spatial pre-processing scheme comprises:
  determining a non-codebook based spatial transformation scheme in response to one or more of:
    a resource size allocated for transmitting the signals exceeding a first threshold,
    mobility of the transmitting device being below a second threshold,
    an order of a modulation and coding scheme for the signals being below a third threshold,
    the signals being scheduled,
    the signals being transmitted via multiple streams, and
    the spatial transformation scheme being followed by the compression scheme to be applied to the signals.

12. The method according to claim 9, wherein determining the spatial pre-processing scheme comprises:
  determining the compression scheme based on one or more of:
    whether the spatial transformation scheme is applied to the signals prior to the compression scheme; and
    a type of the spatial transformation scheme applied to the signals prior to the compression scheme.

13. The method according to claim 12, wherein determining the compression scheme is based further on scheduling information or user information.

14. The method according to claim 9, wherein determining the spatial pre-processing scheme comprises:
  determining an operating parameter for the spatial pre-processing scheme.

15. The method according to claim 14, wherein the operating parameter for the spatial pre-processing scheme includes one or more of:
  an original pointing direction for the spatial transformation scheme,
  an oversampling factor for the spatial transformation scheme,
  a number of dimensions of the signals to be output by the spatial transformation scheme,
  a number of dimensions of the signals to be output by the compression scheme, and
  an energy threshold to be used by the compression scheme.

16. The method according to claim 1, wherein the received signals are a part of single user (SU) transmission or a multiple user (MU) transmission.

17. An apparatus implemented at a receiving device, the apparatus comprising a processor and a memory, said memory containing instructions executable by said processor whereby said apparatus is operative to:
  receive signals from a transmitting device via a plurality of antennas; and
  determine, for a resource unit, a spatial pre-processing scheme to be applied to the signals before baseband processing, based on a predefined mapping between the spatial pre-processing scheme and a type of a channel for carrying the signals, wherein the type of the channel for carrying the signals is indicated in information related to one or more of the received signals, the transmitting device, and the receiving device, and wherein the spatial pre-processing scheme comprises at least a spatial transformation scheme.

18. A non-transitory computer-readable storage medium comprising a computer program product including instructions to cause at least one processor to:
  receive signals from a transmitting device via a plurality of antennas; and
  determine, for a resource unit, a spatial pre-processing scheme to be applied to the signals before baseband processing, based on a predefined mapping between the spatial pre-processing scheme and a type of a channel for carrying the signals, wherein the type of the channel for carrying the signals is indicated in information related to one or more of the received signals, the transmitting device, and a receiving device, and wherein the spatial pre-processing scheme comprises at least a spatial transformation scheme.

19. The non-transitory computer-readable storage medium according to claim 18, wherein the resource unit includes one or more of:
  a resource allocated for a transmission of the signals from the transmitting device,
  a part of the resource allocated for the transmission of the signals, and
  a resource with predefined size.

20. The non-transitory computer-readable storage medium according to claim 18, wherein the information related to one or more of the received signals, the transmitting device, and the receiving device includes one or more of:
  scheduling information of the signals,
  property of the signals,
  information of the transmitting device,
  information related to a processing to be applied to pre-processed signals,
  information related to an output requirement for the spatial pre-processing scheme, and
  information related to an available processing capability of the receiving device.

* * * * *